Jan. 8, 1957 C. W. SANDERS 2,776,534
CROP GUIDING GRATE ASSEMBLY
Filed July 24, 1953 2 Sheets-Sheet 1
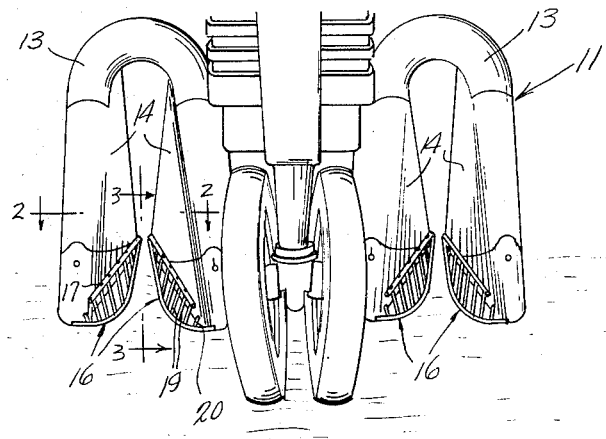
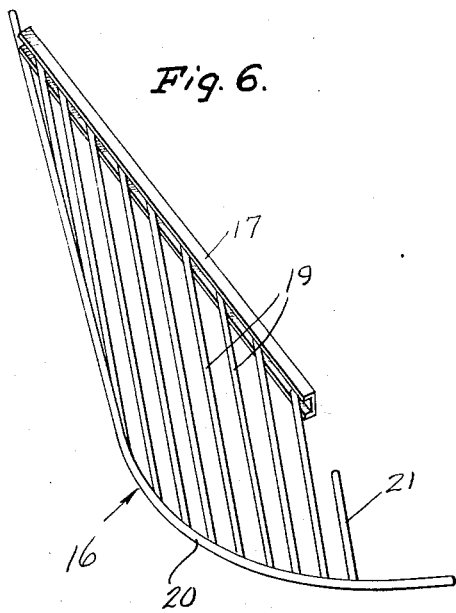
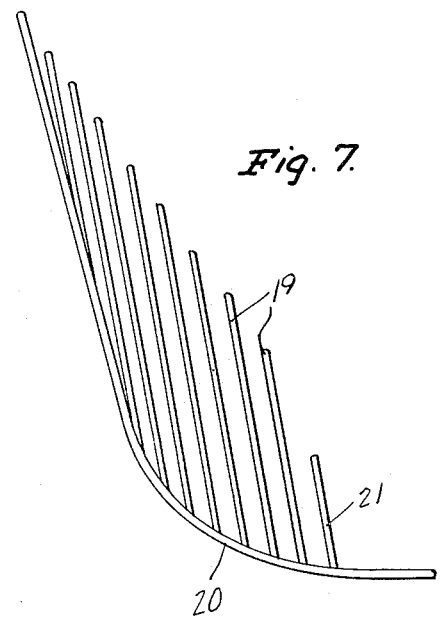
INVENTOR.
Clayton W. Sanders,
BY
McMorrow, Berman + Davidson
Attorneys.

Jan. 8, 1957  C. W. SANDERS  2,776,534
CROP GUIDING GRATE ASSEMBLY
Filed July 24, 1953  2 Sheets-Sheet 2
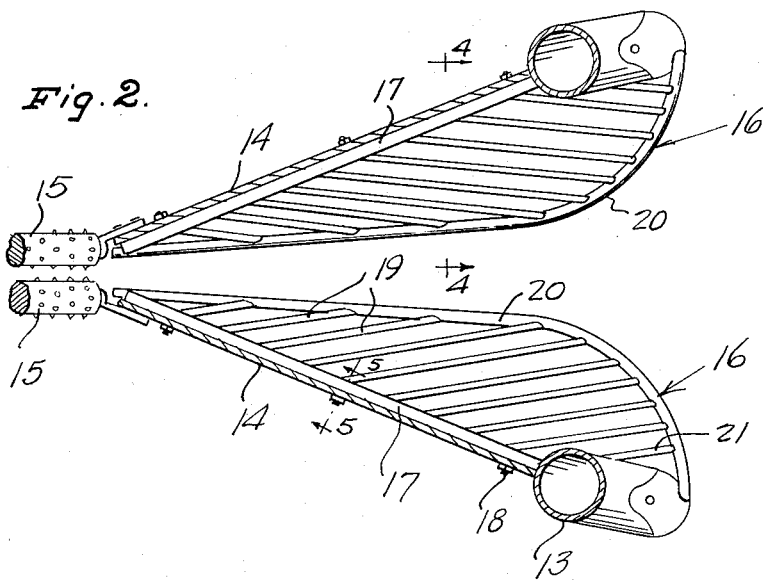
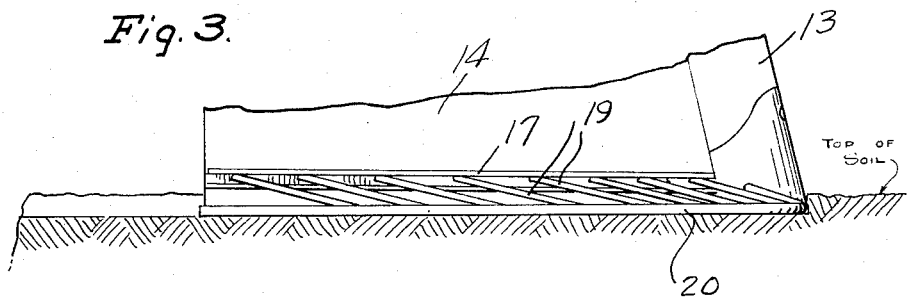
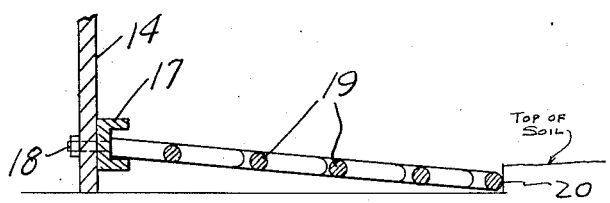
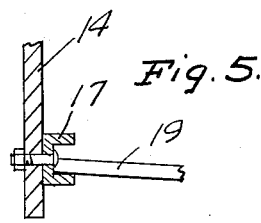
INVENTOR.
Clayton W. Sanders,
BY
McMorrow, Berman + Davidson
Attorneys.

United States Patent Office 2,776,534
Patented Jan. 8, 1957

2,776,534

CROP GUIDING GRATE ASSEMBLY

Clayton W. Sanders, Lorenzo, Tex.

Application July 24, 1953, Serial No. 370,202

3 Claims. (Cl. 56—28)

This invention relates to harvesting equipment, and more particularly to a cotton harvesting attachment of the type employing longitudinal picker rolls for gathering cotton from the ground and from cotton plants.

A main object of the invention is to provide a novel and improved cotton gathering grate structure for a cotton harvesting machine of the type having longitudinal stripping rollers mounted thereon, the grate structure being simple in construction, being easy to install on an existing machine, and greatly improving the efficiency of the machine by preventing the harvested cotton and cotton plants from becoming compacted and excessively compressed when they are received between the stripping rolls, whereby the effectiveness of the stripping rolls is greatly increased.

A further object of the invention is to provide a novel and improved grate structure for a cotton harvesting machine, said grate structure involving inexpensive components, being durable in construction, being easy to install, and providing an improved gathering and distributing action for gathering loose cotton from the ground as well as gathering the cotton plants as the machine is moved forwardly, whereby the cotton is picked up from the ground as well as from the plants and is fed in a substantially uniformly distributed manner to the stripping rolls of the machine.

Further objects and advantages of the invention will become apparent from the following description and claims, and from the accompanying drawings, wherein:

Figure 1 is a front elevational view of a portion of a conventional cotton harvesting machine provided with improved grate elements constructed in accordance with the present invention.

Figure 2 is an enlarged horizontal cross sectional view taken on the line 2—2 of Figure 1.

Figure 3 is an enlarged elevational view taken on the line 3—3 of Figure 1.

Figure 4 is an enlarged vertical cross sectional view taken on the line 4—4 of Figure 2.

Figure 5 is an enlarged cross sectional view taken on the line 5—5 of Figure 2.

Figure 6 is an enlarged perspective view of one of the grate elements employed in Figures 1 and 2.

Figure 7 is a perspective view similar to Figure 6 of the grate element of Figure 6, shown detached from its supporting channel bar.

Referring to the drawings, 11 generally designates a conventional cotton harvesting machine of the type having a wheeled frame including inverted U-shaped support members of tubular construction, shown at 13, arranged on opposite sides of the frame and adjacent the forward end thereof. Secured to the respective arms of each of the inverted U-shaped tubular supporting structures is a rearwardly extending, substantially vertical plate member 14, the plate members 14 being rearwardly convergent, namely, presenting a forwardly divergent configuration whereby cotton plants may be guided toward the longitudinally arranged stripping rolls 15 carried on the frame rearwardly adjacent the rearward ends of the plate members 14.

The structure thus far described is entirely conventional and forms no part of the present invention. In the prior art structure, the cotton plants have a tendency to become excessively compacted as the machine moves forwardly, whereby the efficiency of the stripping rolls 15 is considerably decreased, namely, the stripping rolls are rendered partially inoperative to remove the cotton from the plants, due to the excessive density of the plants as they are brought between the stripping rolls. Another disadvantage is that the plants are unevenly distributed as they are forced between the plates 14, and the action of the stripping rolls is not uniform, whereby some of the cotton plants do not have the maximum amount of cotton removed therefrom. Furthermore, a considerable amount of cotton lies loosely on the ground and is not gathered up by the harvesting structures of the prior art, whereby the loose cotton is wasted.

In accordance with the present invention, respective grate elements, designated generally at 16 are employed on the vertical plate members 14, the grate elements being secured to the lower portions of the plate members and extending downwardly and inwardly towards each other from said plate members. Each grate element 16 comprises an upper channel bar 17 secured substantially horizontally to the lower portion of the associated plate member 14, as by bolts 18, the channel bars 17 facing inwardly towards each other. Rigidly secured to the channel bars in spaced parallel relationship are the parallel downwardly and forwardly projecting rod elements 19, said rod elements being rigidly connected at their ends to respective curved lower marginal bars 20, and the lower bars are positioned laterally inwardly of the upper bars 17 and the lower bars 20 have portions which are only slightly divergent from each other. The rods 19 of the two grates converge forwardly, as shown in Figure 2, and the bars 20 are arranged slightly below ground level, as shown in Figure 3. The forward ends of the lower marginal bars 20 are curved laterally and downwardly, as shown in Figure 2, and are spaced substantial distances forwardly of the forward ends of the associated channel bars 17, the forward ends of the marginal bars 20 being respectively connected, as by welding or the like, to the lower portions of the associated vertical legs of the respective inverted U-shaped frame elements 13. Secured to the forward end portions of the respective marginal bar members 20 is at least one additional rod element 21 extending parallel to and spaced from the other rod elements 19 of the grate structures, the inner end of the additional rod elements 21 being rigidly secured, as by welding, or the like, to the adjacent vertical leg of the associated inverted U-shaped frame element 13.

In operation of the machine, the marginal bar elements 20 of the grate structures engage slightly below the surface of the soil as the machine moves forwardly, picking up the loose cotton as well as assisting in loosening and elevating the cotton plants, whereby the loose cotton and the plants are forced upwardly along the grate structures 16 and are guided inwardly by said grate structures and by the vertical plates 14 toward the stripping rolls 15. The grate structures 16 provide a means for sifting loose soil from the loose cotton and cotton plants as they are elevated and also serve to distribute the loose cotton and cotton plants in a uniform manner as they are fed between the stripping rolls 15. This provides a smoother action of the stripping rolls 15 as well as a more efficient separation of the cotton from the plants as the machine is moved forwardly over its course of travel.

The grate structures 16 above described are particularly effective where the ground is cultivated irregularly; the grate structures 16 are very suitable for efficiently picking up all open bottom cotton bolls and limbs lying on the ground of this kind, which prior grates employed on various types of cotton pullers have been unable to gather efficiently.

While a specific embodiment of an improved grate structure for a cotton harvesting machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a harvesting machine, a pair of laterally spaced vertical supports having lower edges and forward and rearward ends, said lower edges diverging forwardly from each other and having laterally inward sides, grates fixed on the laterally inward sides of the supports at points spaced above and adjacent to said lower edges, said grates comprising upper bars secured on said laterally inward sides and extending from the rearward ends of said support to the forward ends thereof above said lower edges, parallel spaced rods having one of the ends thereof secured to said upper bars, said rods extending in forward, laterally inward, and downwardly directions, and lower marginal bars secured to the other of the ends of said rods, said lower marginal bars diverging forwardly with respect to each other and being positioned laterally inwardly of said upper bars and having laterally outwardly curved forward end portions.

2. In a harvesting machine, a pair of laterally spaced vertical supports having lower edges and forward and rearward ends, said lower edges diverging forwardly from each other and having laterally inward sides, grates fixed on the laterally inward sides of the supports at points spaced above and adjacent to said lower edges, said grates comprising upper bars secured on said laterally inward sides and extending from the rearward ends of said support to the forward ends thereof above said lower edges, parallel spaced rods having one of the ends thereof secured to said upper bars, said rods extending in forward, laterally inward, and downwardly directions, and lower marginal bars secured to the other of the ends of said rods, said lower marginal bars diverging forwardly with respect to each other and being positioned laterally inwardly of said upper bars and having laterally outwardly curved forward end portions, said upper bars being secured to the supports at points parallel to the lower edges of the supports, and said lower marginal bars being positioned substantially on a level with the lower edges of the supports.

3. In a harvesting machine, a pair of laterally spaced supports having lower edges and forward ends and laterally inward sides, said supports diverging forwardly and downwardly relative to each other, a grate on each support comprising a horizontal upper bar secured to the inward side of a support and spaced above the lower edge thereof, a lower horizontal bar unsecured to a support, said lower bar being located in the region of the lower edge of a support and spaced below said upper bar, said lower bars having forward and rear ends and straight portions extending forwardly from their rear ends, said straight portions being laterally inwardly spaced from said upper bars and being forwardly divergent from each other at a smaller angle than said supports, said lower bars having laterally outwardly curved portions extending from said straight portions to the forward ends of the lower bars, and rods having their ends fixed to the upper and lower bars, respectively, said rods being spaced parallel from each other along the bars and declining forwardly from their upper ends to their lower ends.

References Cited in the file of this patent

UNITED STATES PATENTS

| | | |
|---|---|---|
| 457,820 | Noyes | Aug. 18, 1891 |
| 756,861 | Layton | Apr. 12, 1904 |
| 960,340 | Kimball | June 7, 1910 |
| 1,926,338 | Johnston | Sept. 12, 1933 |
| 2,388,454 | Weeth et al. | Nov. 6, 1945 |
| 2,406,058 | Boone | Aug. 20, 1946 |
| 2,677,226 | Hyman | May 4, 1954 |
| 2,690,898 | Melcher | Oct. 5, 1954 |
| 2,701,944 | Lindley | Feb. 15, 1955 |